United States Patent [19]
Koch

[11] 3,822,487
[45] July 9, 1974

[54] ALPHABET BLOCK DISPLAY AND TOY
[76] Inventor: George B. Koch, 644 Landfair, No. 105, Los Angeles, Calif. 90024
[22] Filed: Mar. 15, 1973
[21] Appl. No.: 341,460

[52] U.S. Cl. .......................... 35/35 J, 35/71, 35/73, 40/142 R, 46/26
[51] Int. Cl. ............................................. G09b 1/40
[58] Field of Search .............. 35/35 J, 31 G, 69–73, 35/18 A; 46/26; 40/140, 142 R, 145 R

[56] References Cited
UNITED STATES PATENTS

| | | | |
|---|---|---|---|
| 2,493,435 | 1/1950 | Archambault | 46/26 |
| 2,514,808 | 7/1950 | Sheldon | 40/142 R |
| 2,843,971 | 7/1958 | Gardellin | 35/72 X |
| 3,270,452 | 9/1966 | D'Elia et al. | 40/140 |
| 3,423,093 | 1/1969 | Lahav | 35/18 X |

FOREIGN PATENTS OR APPLICATIONS

| | | | |
|---|---|---|---|
| 371,638 | 4/1932 | Great Britain | 46/26 |
| 189,276 | 5/1937 | Switzerland | 40/140 |

Primary Examiner—Wm. H. Grieb
Attorney, Agent, or Firm—Miketta, Glenny, Poms & Smith

[57] ABSTRACT

Alphabet letters and other symbols are constructed in relatively large three-dimensional block form. The block symbols are provided with connecting means in the form of elongated connecting rods cooperating with mated recesses or sockets formed within the letter blocks. The sockets are arranged on each of the blocks so that the symbols, such as letters of the alphabet can be arranged in vertical, horizontal and/or front to back word displays. The block letters or symbols are provided with recesses or sockets particularly arranged to receive the inter-connecting rods so that nonsensical arrangements of the blocks, such as an upside down letter, are precluded. As an educational toy, this helps the child assemble the letter blocks into a meaningful word pattern, or at least into a display in which letters of the alphabet are properly oriented.

10 Claims, 8 Drawing Figures

PATENTED JUL 9 1974 3,822,487

ALPHABET BLOCK DISPLAY AND TOY

BACKGROUND OF THE INVENTION

The present invention relates to display systems or devices, and particularly to systems in which letters of the alphabet, numbers, or other symbols are represented in three-dimensional or block form and are individually moveable into a meaningful array of symbols.

SUMMARY OF THE INVENTION AND ITS OBJECTIVES

It is an object of the present invention to provide a set of building blocks shaped or marked as symbols, such as the letters of an alphabet, that can be connected together to form an array of symbols, for example, constituting a word or other informative display.

It is a further object of the present invention to provide a set of such building blocks as an educational toy, in which the blocks may be connected only in certain structurally constrained arrangements. These arrangements preclude at least some improper symbol orientations. In other words, certain nonsensical arrangements of the block symbols, such as an upside down letter of the alphabet, are precluded. This forces the child to connect the block letters or other symbols in their proper upright orientation so that he or she will become familiar with the particular letter or number configuration.

It is a further object of the present invention to provide a set of three-dimensional block letters and means for connecting the letters, such that they may be arranged not only in a horizontal side-by-side pattern, but also in a stacked vertical pattern and a front-to-back pattern, and in any combination of horizontal, vertical and front-to-back arrays.

These and other objects are achieved in accordance with the presently disclosed embodiment of the invention by a set of toy or display blocks shaped in the form of letters, numbers, arithmetical signs, etc. In general the blocks are shaped in the form of recognizable symbols. In the present embodiment, both letter blocks, sometimes called "alphablocks" and number blocks are illustrated by way of example.

The "alphablocks" are accompanied by a plurality of connecting rods or elongated members for joining the various letters or blocks into a desired word or other display. Each symbolic block is formed with a set of recesses into which the ends of the connecting rods may be removably secured. The block recesses may be provided by the sides, top, bottom, front and back of each letter, number or other symbol, to receive connecting rods extending horizontally, vertically, and in front-to-back relationship.

The block letters may be relatively large and may be brightly painted to catch the attention of a child, when used as an educational toy, or to catch the eye of a customer, when employed as an advertising display.

The recesses and/or connecting rods are formed to preclude the connection of a block letter or number in an upside down or front-to-side relationship with respect to the remaining block letters. As an educational toy, this avoids undue confusion to a child who has only a partial knowledge of the alphabet letters, numbers, etc. Also, a child who is just learning the alphabet is forced to become familiar with the letters in their proper upright stance.

These and further objects and various advantages of the alphabet block display and toy according to the present invention will become apparent to those skilled in the art from a consideration of the following detailed description of the following particular and preferred embodiments thereof.

BRIEF DESCRIPTION OF THE DRAWINGS

Reference will be made to the appended sheets of drawings in which.

DESCRIPTION OF THE PREFERRED EMBODIMENT

Figure 1:
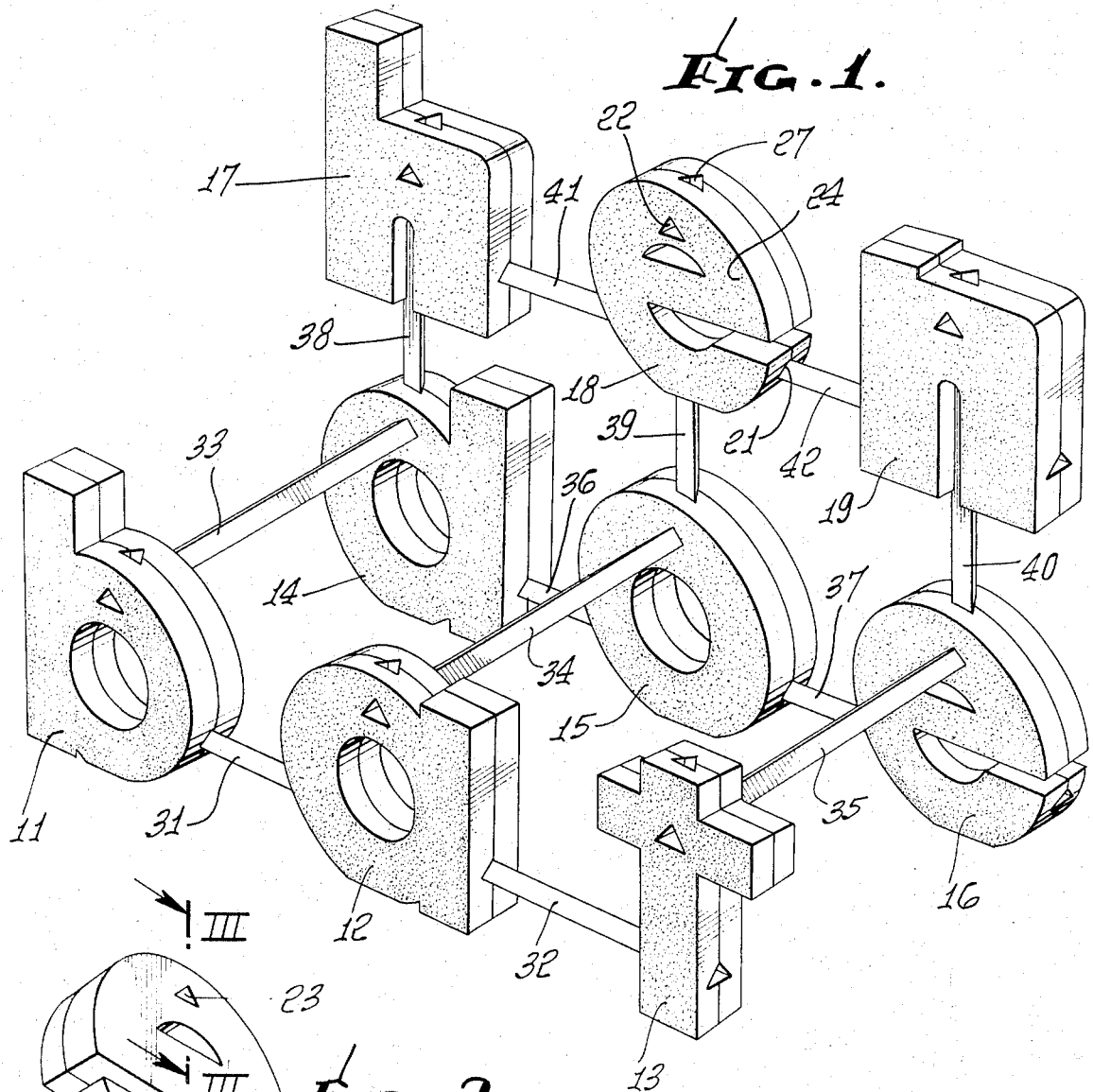
FIG. 1 is a perspective view of the alphabet block display and toy in accordance with the present invention.
Figure 2:
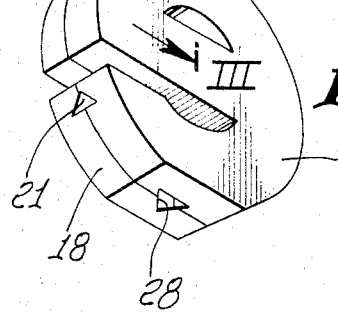
FIG. 2 is a perspective rear view of one of the "alphablocks" of FIG. 1.
Figure 3:
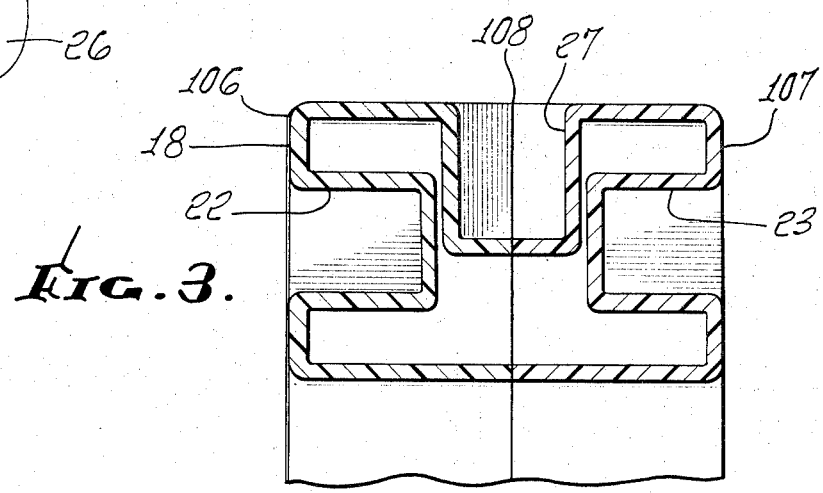
FIG. 3 is a vertical section view of the "alphablock" shown in FIG. 2, taken generally along the plane III—III thereof.

With reference to FIG. 1, the preferred embodiment of the invention includes a set of three-dimensional building blocks 11 through 19, each shaped in this instance to represent an alphabet letter. As disclosed more fully herein, each of the blocks is formed with recess means for matingly receiving and securing the ends of elongated connecting rods or members such that the various letter blocks may be selectively structurally interconnected to form a display pattern or array as shown in FIG. 1.

Figure 8:
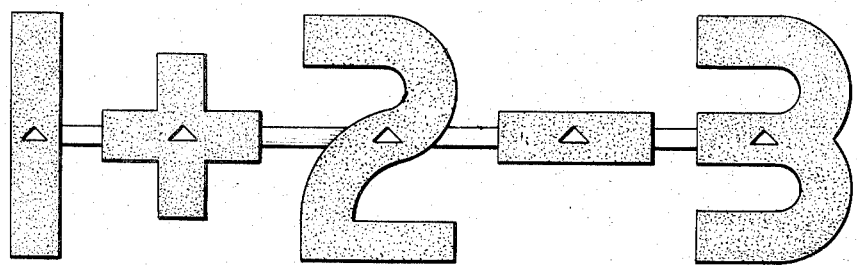
FIG. 8 is a front elevation view of arabic numbers and arithmetical symbols constructed as building blocks and inter-connected by the elongated rods in accordance with the present invention.

Although blocks 11 through 19 are here shaped to represent alphabet letters, the blocks may be formed to represent numbers, arithmetical signs such as plus or minus, or any other desired symbol. With reference to FIG. 8 an embodiment of the invention is illustrated in which the blocks are shaped in the form of arabic numerals and arithmetical signs and arranged to form a mathematical array.

Although the size of the symbolic blocks may vary depending upon the intended use, in the presently disclosed embodiment the alphablocks such as shown in FIG. 1 are relatively large. For example blocks 11 through 19 may be approximately two feet in height, one foot in width, and six inches in depth.

There are many different situations in which the set of blocks may be used. However, it is contemplated that the blocks will be primarily used either as an educational toy or as an "eye-catching" display, especially a commercial or advertising display for stores.

When used as an educational toy, the relatively large size of the three-dimensional blocks and the capability of selectively and structurally interconnecting the various blocks in a creative pattern or array, easily attracts the attention of a child. Similarly, a store display of alphablocks arranged to form an advertising message will readily attract the "eye" of a potential customer. The letter blocks and interconnecting bars or members may be sold individually, or a complete set of alphabet letters may be made available as a package purchase. As an educational toy, such as for a school, an entire set of all of the letters of the alphabet may be desired, whereas only certain letters may be required to set up a store display.

As an important feature of the presently disclosed embodiment, each of the blocks is provided with means, here including recess means and elongated connecting members constructed and arranged for structurally interconnecting the blocks to form horizontal, vertical, and/or front-to-back (depth dimension) symbolic arrays. For example, with reference to FIG. 1 the three block sets spelling "bat," "doe," and "hen" each illustrate a horizontal pattern or array in which the letters are arranged in a side-by-side format. The letter blocks 17, 18 and 19 forming "hen" are arranged in overlying relationship to the blocks 14, 15 and 16 spelling "doe" to illustrate the vertical array. Finally, the front-to-back or depth array is shown by the connection of blocks 14, 15 and 16 constituting "doe" in front-to-back relationship with the blocks 11, 12 and 13 spelling "bat."

Using the letter *e* block 18 as an example, each block's recess means includes a pair of side recesses, only one of which is shown as recess 21, front and back recesses 22 and 23 disposed on the front and back faces 24 and 26 of the letter block, and top and bottom recesses 27 and 28. The side recesses extend into the block in horizontal alignment. Similarly, the top and bottom recesses extend into the block in vertical alignment, while the front and back recesses are aligned in the depth dimension or along a line perpendicular to the faces of the blocks.

Each block recess is disposed and shaped to receive an end of one of a plurality of elongated connecting bars or members, such as members 31 through 42 shown in FIG. 1. Members 31 through 42 may have at least two different standard lengths to selectively dispose the various letters or other symbols in proper spaced-apart relationship. For example, the front-to-back connecting members 33 through 35 cooperating with the front and back recesses may be selected to have a greater length than the horizontal connecting members 31, 32, 36, 37, 41 and 42 to provide an effective spacial separation of the various word forms.

While the specific embodiment shown in FIG. 1 provides block recesses and connecting members arranged to extend in mutually perpendicular or orthognal directions, the symbolic blocks may alternatively be provided with recesses extending obliquely to the horizontal, vertical and front-to-back dimensions. For example, recesses and connecting members may be provided to extend at 45° with respect to the horizontal and vertical directions.

According to a further important aspect of this embodiment of the present invention means are provided to prevent certain arbitrary and nonsensical orientations of the represented symbols. By precluding certain nonsensical orientations, such as an upside down letter, the educational aspect of the building blocks is enhanced by forcing the child to assemble the various letters in their proper upright positions.

Although the various letters may be arranged in arbitrary spelling patterns, the exclusion of upside down letter orientations eliminates one variable which the child must contend with in using the blocks. Also, for a child who is just learning the letters of the alphabet, it is important to have the letter blocks disposed in their normal upright disposition so that he becomes familiar with the letter shapes.

Figure 4:
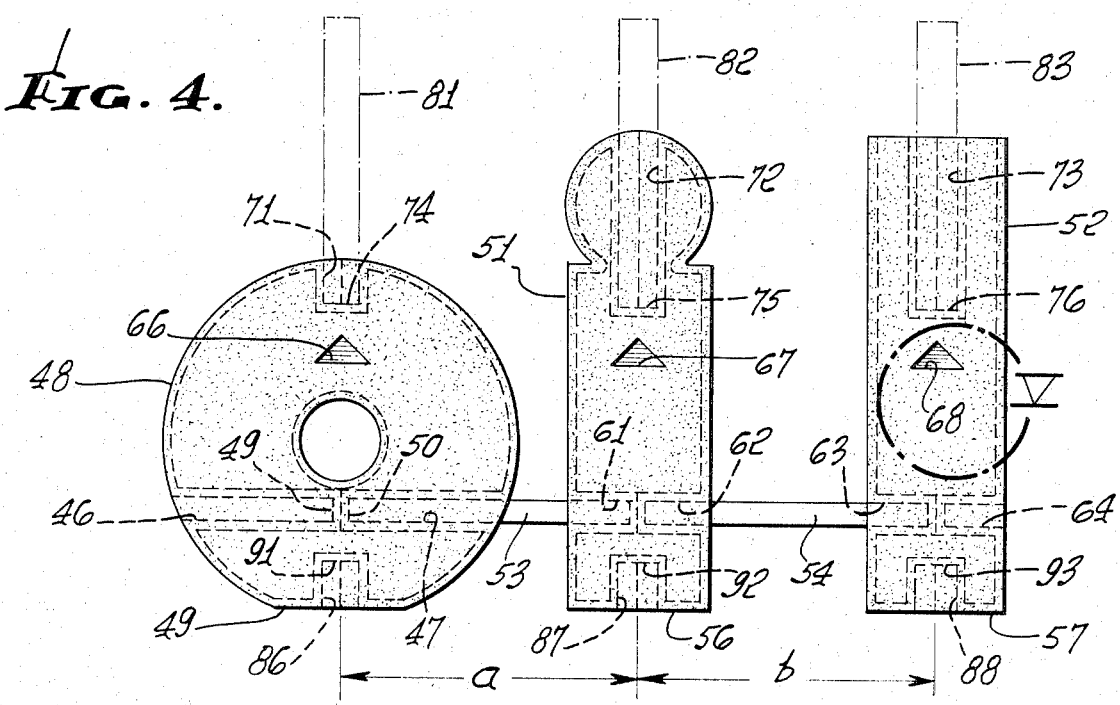
FIG. 4 is a front elevation view of another set of "alphablocks" arranged in a horizontal array and with vertical connecting members shown in phantom for receiving vertically stacked "alphablocks."

One way in which this means is provided in accordance with the present embodiment is to dispose the various side recesses of the alphablocks at uniformly spaced distances above the bases of each block. For example, as shown in FIG. 4, the side recesses 46 and 47 of the *o* letter block 48 are uniformly spaced from a base 49 of the block. In this manner, when a set of letter blocks, such as blocks 48, 51 and 52 as shown in FIG. 4 are horizontally interconnected by members 53 and 54 to form the word "oil," it is observed that each of the bases, namely bases 49, 56, and 57 assumes a common plane. This common plane forms a support which may rest on a floor, table top, etc.

Moreover, this uniform spacing between the base of each block and the side recesses is selected to position the recesses either above or below mid-height of the block. In this instance, the side recesses, such as recesses 46 and 47 of block 48, recesses 61 and 62 of block 51, and recesses 63 and 64 of the block 52 are disposed in a horizontal plane lying below mid-height of the block letters. It will be apparent from this construction, that one or more of the letters cannot be connected upside down and still maintain the common base plane here defined by bases 49, 56 and 57. A child assembling the letters, will be guided by this structural constraint to arrange all of the letters or other symbols in their proper upright orientation.

A similar structural constraint is provided in the particular placement of the front and back recesses of the various letter blocks. Again with reference to FIG. 4, front recesses 66, 67 and 68 and the aligned back recesses (not shown) of letter blocks 48, 51 and 52 are all uniformly spaced above the block bases 49, 56 and 57. Moreover, this vertical spacing or elevation of the front and back recesses is selected to lie above as in this instance, or alternatively below, mid-height of the block letters. As in the case of the horizontal array, this construction precludes the assembling of upside down letters in a front-to-back array. All of the letter blocks connected in such a front-to-back array must be upright in order to dispose the bases of all of the blocks in the common plane.

Additionally, a further structural constraint is provided by disposing the front-to-back recesses at a different elevation relative to the side recesses. Accordingly here, front (and back recesses) 66, 67 and 68 are positioned above mid-height of each of the blocks while the side recesses 46, 47, 61, 62, 63 and 64 are disposed below the mid-height level. When interconnecting the symbolic blocks, this precludes the arbitrary connection of the front or back recesses of one of the blocks with a side recess of another.

Thus, the front faces of the various blocks in this particular embodiment are always maintained in a common plane or in different planes which are parallel. This is illustrated in FIG. 1 by the letter blocks 14 through 19 being disposed with their front faces corresponding to face 24 of block 18, in a common vertical plane which is parallel to another vertical plane defined by the front faces of letter blocks 11 through 13. With further reference to FIG. 4, top recesses 71, 72 and 73 of blocks 48, 51 and 52 are formed to extend into the blocks and terminate at ends 74, 75 and 76. These terminal ends 74 through 76 are uniformly vertically spaced from bases 49, 56 and 57 of the blocks irrespective of the actual height of each symbolically shaped block. Thus, the length of the recesses 71, 72 and 73 varies depending upon the actual block height. The letter *l* represented by block 52 will have a deeper recess than the shorter letter *o* represented by block 48.

Nevertheless, the terminal ends of these top recesses are uniformly spaced from the block bases such that the various connecting members 81, 82 and 83 shown in the phantom in FIG. 4 are disposed at a uniform vertical height for supporting vertically stacked blocks thereon. This vertical stacking is also illustrated in FIG. 1 in which members 38 through 40 extend to uniform heights to support letter blocks 17 through 19.

With reference to FIG. 4 the bottom recesses, such as recesses 86, 87 and 88, of the various letter or symbolic blocks are all formed to terminate at recess ends, such as ends 91, 92 and 93, positioned at a uniform elevation or height above the letter block bases. When these blocks are mounted on top of vertically extending connecting members such as members 81 through 83, the bases of these blocks will be disposed in a common horizontal plane overlying the tops of the lower supporting letters.

The side recesses, such as recesses 46 and 47 of the *o* letter block 48, extend to terminal ends, such as ends 49 and 50 which are in this instance, positioned proximate one another substantially mid-way of the block. The letter blocks are structurally interconnected by inserting the various elongated connecting members, such as member 53, until its axial end abuts the terminal end of the block recess. This will provide a proper horizontal spacing between the letters as illustrated in FIGS. 1 and 4.

The front faces, such as face 24 of letter block 18 in FIG. 1, may be marked as indicated in the drawings, by a bright paint, to indicate the front of each of the letter shape. By teaching the child that the particular color, corresponding to the front face, must be positioned forward of the display, he will be able to arrange the blocks with the proper front facing orientation. It may be that only certain of the symbolic blocks need be marked to distinguish the front surface from the back.

Although any of various cross-sectional shapes may be employed for the elongated connecting members, such as circular, square, oval, etc., it is preferred that these bars or members be provided with at least one flat or planar surface matingly engageable with a complementary flat or planar surface formed in each block recess.

This feature is advantageously provided in the present embodiment by forming the interconnecting members to have a triangular cross-section, wherein the defined cross-section is an isosceles triangle. Each recess is similarly formed to snugly receive the triangular cross-section end of each elongated member. The triangular configuration of the bars avoids a potential hazard which might otherwise be presented by circular cross-section members which might roll and possibly cause a child or even an adult to slip and fall. Furthermore, the isosceles triangular configuration presents one unique planar surface, corresponding to non-equal side of the triangle, which may function as the indexing surface mentioned above.

In this respect, the formation of the recesses and connecting members with complementary indexing surfaces provides another means by which the interconnection of the blocks may be structurally constrained to preclude certain arbitrary symbol orientations. This can be seen from the following construction.

Figure 5:
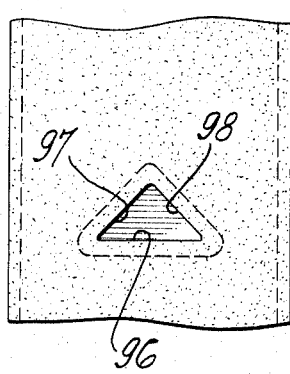
FIG. 5 is an enlarged detail view taken from FIG. 4 as indicated at V showing one of the recesses of the "alphablocks" into which an end of the elongated connecting bar or rod may be removably fitted.

With reference to FIG. 5 an enlarged view of the front recess 68 of letter block 52 of FIG. 4 is shown. As indicated, the isosceles triangular configuration of the recess defines a planar index surface 96 which is unique with respect to the remaining planar surfaces 97 and 98 corresponding in this instance to the two shorter sides of the isosceles triangle. Index surface 96 of the recess together with surfaces 97 and 98 matingly receive and snugly secure the complimentary planar surfaces at the end of each connecting member. In this manner the angular orientation of each connecting member relative to the associated block is defined.

The various recesses formed in each of the letter or symbolic blocks may be uniformly oriented to structurally constrict the assembly of the blocks to certain block orientations. For example, the front and back recesses of the various blocks may be oriented to dispose the index surface in parallelism with the base of each of the associated letter blocks. This will constrict the angular orientation of the interconnecting members such that letters connected between the front and back recesses are uniformly oriented. The side recesses and top and bottom recesses may be similarly formed to uniformly orient the index surfaces thereof and to limit the assembly of the blocks to certain horizontal and vertical letter patterns. These patterns may be the same as described above in relation to the uniform elevational spacing of the various recesses. Thus the construction of the connecting members and recesses with the complementary indexing surfaces may be employed together with or as an alternative to the above described means to achieve the defined structural constraint on the block orientations.

Figures 6, 7:
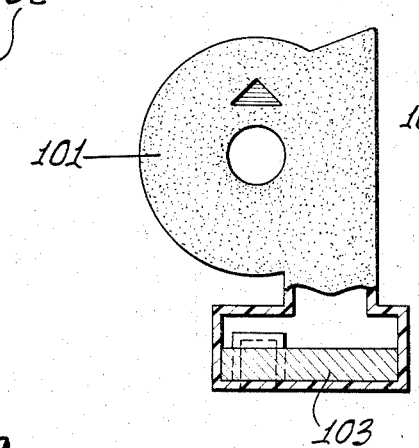
FIG. 6 is a front elevation view of a block letter, shown partly in section, to illustrate how certain of the letters may be weighted at the bottom.
FIG. 7 is a view similar to FIG. 6 and showing another "alphablock" weighted at the bottom for stability.

For stability, certain of the symbolically shaped blocks may be weighted adjacent the base. For example, as illustrated in FIGS. 6 and 7, blocks 101 and 102, shaped to form the letters *q* and *p* respectively, are provided with weight means 103 and 104 adjacent the bases of the blocks for upright standing stability. In this instance, blocks 101 and 102 are formed with a hollow interior and weight means 103 and 104 may be provided by any relatively heavy material, such as sand, lead, etc. disposed within the hollow blocks.

The symbolic blocks may be made of plastic, cardboard, wood, or any other suitable material that is economical for mass production. In this instance, the blocks of FIGS. 1 through 7 are formed from molded plastic parts defining opposite hollow split halves of each letter block. For example, with reference to FIGS. 2 and 3, the letter *e* block 18 is provided by half sections 106 and 107 adhesively joined at the intersection 108 of a vertically bisecting plane parallel to the front and back faces 24 and 26 of the letter.

While only a limited number of embodiments of the present invention have been disclosed herein, it will be readily apparent to persons skilled in the art that numerous changes and modifications may be made thereto without departing from the spirit of the invention. Accordingly, the foregoing disclosure and description thereof are for illustrative purposes only and do not in any way limit the invention which is defined only by the following claims.

I claim:

1. A set of three-dimensional blocks, each of said blocks being shaped in the form of an alphabet letter, number or other symbol; each said block having recess means; a plurality of elongated connecting members, the ends of said connecting members being matingly removably received in said recess means to structurally interconnect said blocks, said recess means being disposed on said blocks to receive said connecting members from the sides, front, back, top and bottom of said blocks such that the alphabet letters, numbers or other symbols represented thereby may be selectively arranged in horizontal, vertical and/or front-to-back arrays.

2. The set of blocks of claim 1, wherein at least certain of said recess means and said connecting members are formed to structurally constrain the interconnection of said blocks to cause the letters, numbers or other symbols represented thereby to be disposed in an upright orientation.

3. The set of blocks of claim 1, wherein said recess means and elongated members structurally interconnecting said blocks are constructed to maintain said blocks in spaced apart relationship.

4. The set of blocks of claim 1, said block recess means comprising side recesses, front and back recesses, and top and bottom recesses, said side recesses being uniformly spaced from the base of each block either above or below mid-height thereof so that all such blocks which are horizontally interconnected via said side recesses by said elongated members must be in a proper upright orientation to dispose the bases of said blocks in a common plane.

5. The set of blocks of claim 4, said front and back recesses being uniformly spaced from the base of each block at a different elevation relative to said side recesses such that all blocks which are interconnected via said front or back recesses by a connecting member must be connected to the front or back recess of another block in order to dispose the bases of all such interconnected blocks in said common plane.

6. The set of blocks as defined in claim 5, said front and back recesses of each of said blocks being uniformly disposed either above or below mid-height of said blocks such that all blocks which are interconnected by said elongated members via said front or back recesses must be in proper upright orientation to dispose the bases of said blocks in said common plane.

7. The set of blocks as defined in claim 4, said top and bottom recesses extending into said blocks and terminating at ends uniformly spaced in the vertical dimension from the bases of said block irrespective of the actual height of each symbolically shaped block such that the bases of a group of horizontally interconnected blocks vertically stacked on top of another group of horizontally interconnected blocks are disposed in a common plane.

8. The set of blocks as defined in claim 1, said recess means comprising a plurality of recesses disposed to receive said connecting members in three different and mutually orthogonal directions corresponding to horizontal, vertical and front-to-back arrangements of said blocks, at least certain of said connecting members having at least one substantially planar surface longitudinally thereof, and at least certain of said recesses having a complementary planar surface matingly engagable with an end portion of said member surface.

9. The set of blocks of claim 8, said member surface being an index surface and said complementary recess surface being uniformly oriented relative to the base of each block so as to cause the symbols represented by said blocks to assume an upright orientation and the bases of said blocks to assume parallel planes.

10. The set of blocks in claim 9, said certain connecting members having triangular cross-sections and said recesses having mated triangular cross-sections, one of the sides of said triangular cross-sections being different from the other sides so as to define said index surface.

* * * * *